Figure 1:
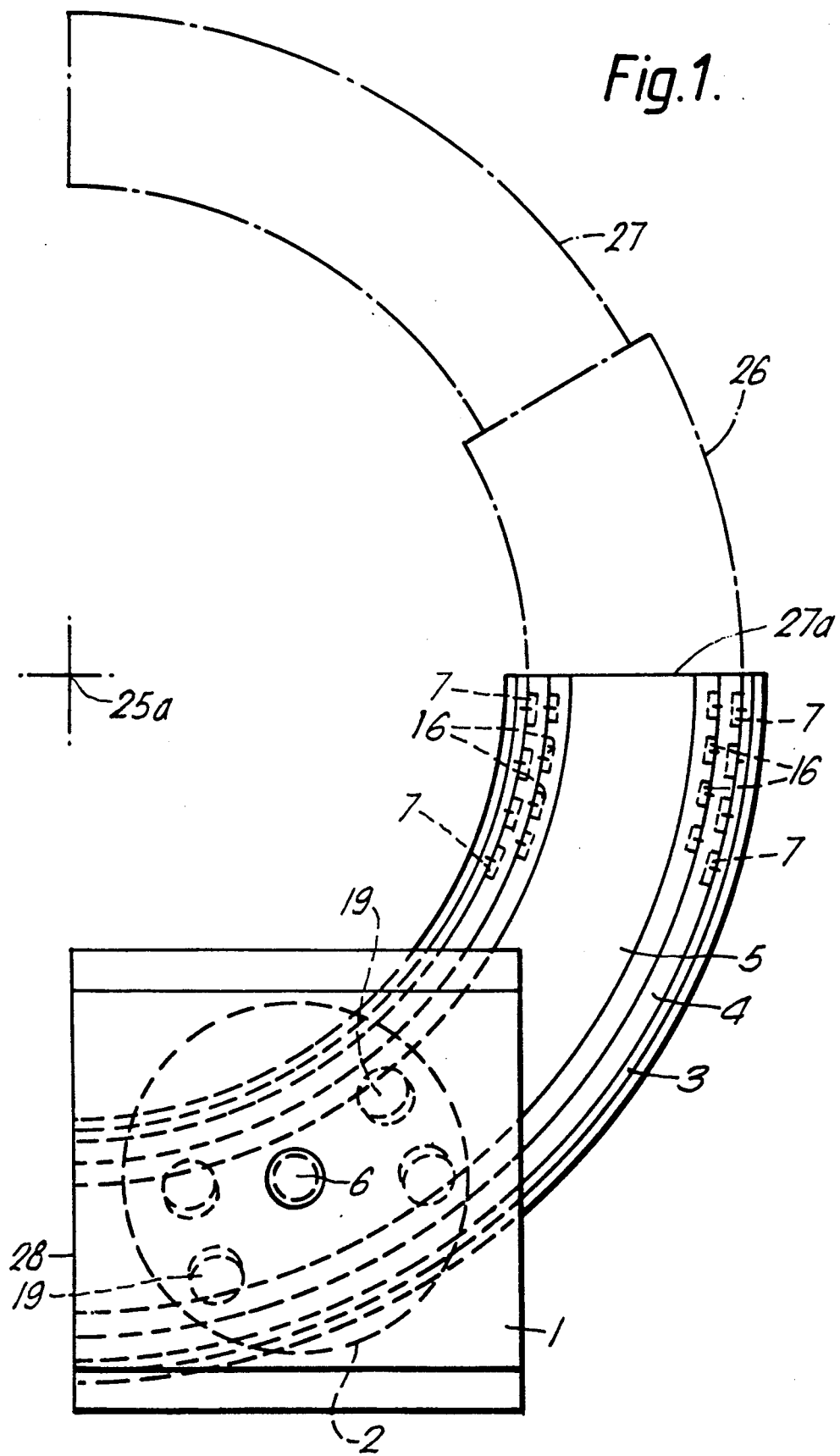

United States Patent [19]

Goodall

[11] Patent Number: 5,195,712
[45] Date of Patent: Mar. 23, 1993

[54] EXTENDABLE SEAT ARRANGEMENT FOR VEHICLES

[76] Inventor: Melvyn J. Goodall, 7 Neville Road, Bognor Regis, Sussex, England

[21] Appl. No.: 585,598

[22] Filed: Sep. 20, 1990

[51] Int. Cl.⁵ ............................................. F16M 13/00
[52] U.S. Cl. .................... 248/430; 248/429; 297/349
[58] Field of Search ............... 248/429, 652, 664, 419, 248/424, 425, 430; 297/349, 240; 296/65.1; 414/921

[56] References Cited

U.S. PATENT DOCUMENTS

| | | | | |
|---|---|---|---|---|
| 1,741,784 | 12/1929 | Lucas | | 248/425 |
| 2,446,906 | 8/1948 | Buker | | 248/425 |
| 2,472,349 | 6/1949 | Smith | | 248/425 |
| 3,043,622 | 7/1962 | Milner | | 248/425 |
| 4,544,202 | 10/1985 | Keaton | | 248/425 |
| 4,570,997 | 2/1986 | Tanizaki | | 248/429 |
| 4,784,434 | 11/1988 | Iwami | | 248/429 |
| 4,792,188 | 12/1988 | Kawashima | | 248/425 |
| 4,815,785 | 3/1989 | Goodall | | 248/430 |

FOREIGN PATENT DOCUMENTS 2071585 9/1981 United Kingdom .

Primary Examiner—Carl D. Friedman
Assistant Examiner—Korie H. Chan
Attorney, Agent, or Firm—Cesari and McKenna

[57] ABSTRACT

An extendible seat arrangement for use in moving a seat in and out of a confined space includes a plurality of telescopically-extending interlocking sections which nest one within the other and are curved. One of the sections includes a carrier for carrying the seat. A motor is arranged to move the sections between their extended and retracted positions.

7 Claims, 5 Drawing Sheets

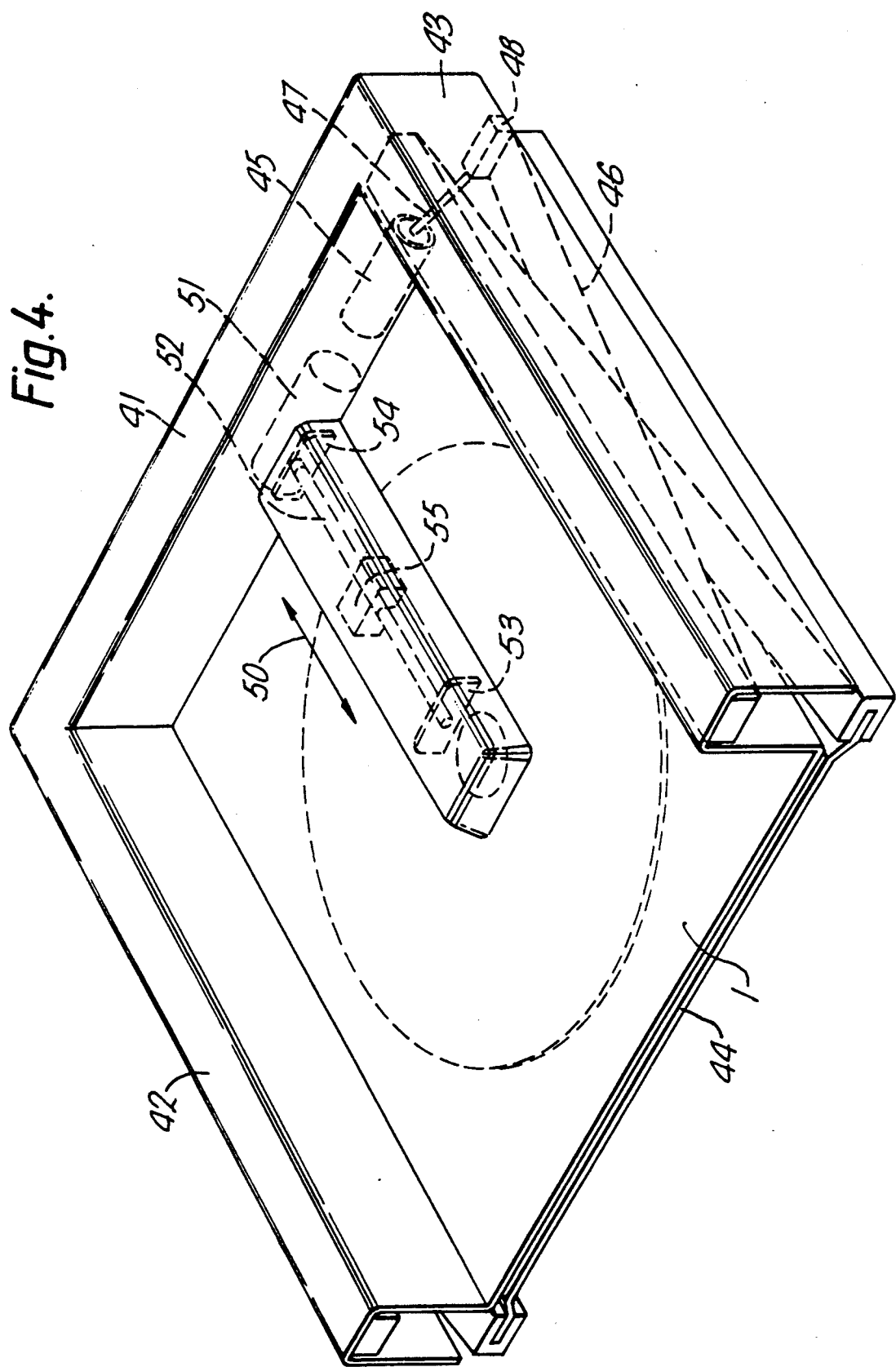

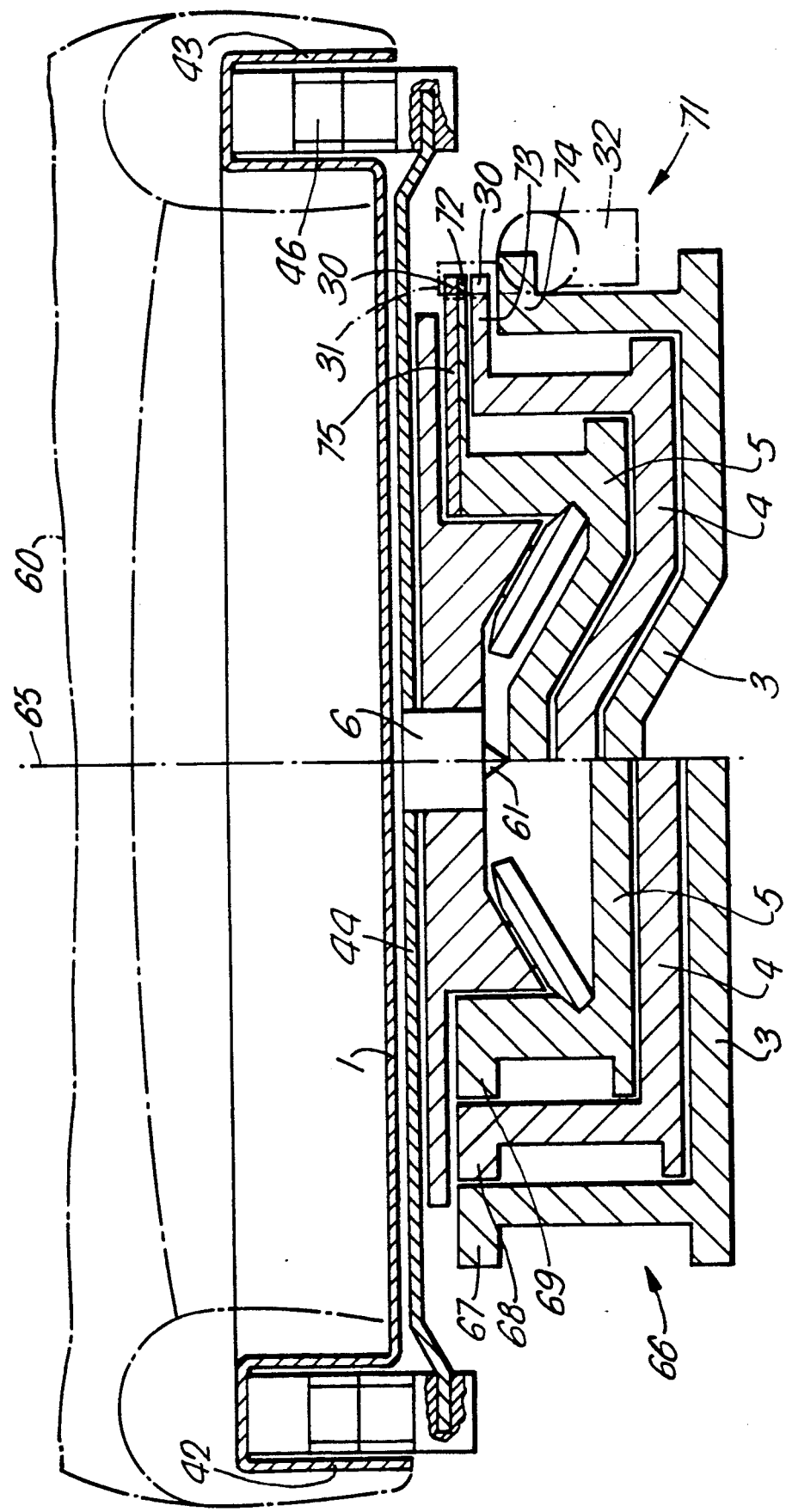

EXTENDABLE SEAT ARRANGEMENT FOR VEHICLES

This invention relates to an extendable seat arrangement for vehicles which enables a user, particularly an invalid, to enter and leave a vehicle with comparative ease and which occupies a smaller space in a vehicle than do previously proposed arrangements which provide similar facilities.

It is, for example, known from UK Patent Publication No. 2,071,585 to provide a platform for a specially designed wheel chair, the platform comprising a generally rectangular beam and a carriage slidable on the beam, in which the platform is mounted on a motor vehicle in such a way that it can swing between positions inside and outside of the vehicle and the carriage can slide along the beam.

In such previously proposed arrangements, the mechanism occupies an area of the floor of the vehicle which extends far beyond that which is normally occupied by the vehicle seat. The arrangement presently proposed occupies both a minimum of floor area and a minimum of volume.

In an embodiment of the invention to be described at least three telescopically extending interlocking sections are employed to carry a seat from the outside to the inside of the vehicle, thereby enabling the overall length of the sections when telescoped together within the vehicle to be kept to a minimum. In the embodiment to be described, the sections interlock in such a way that the depth of the assembly is kept small, giving a very low profile. Furthermore, although in the embodiment to be described the sections to be telescoped are curved, it would be possible to achieve a similar result by employing straight interlocking telescopic sections, all of which pivot about a single pivot point on the vehicle.

In the particular embodiment, it will be noted that the telescopic assembly does not protrude behind the area occupied by the car seat, and that the curved sections of the assembly when telescoped together extend over an arc which is no greater than 90° taken from the origin of the curve.

Figure 2:
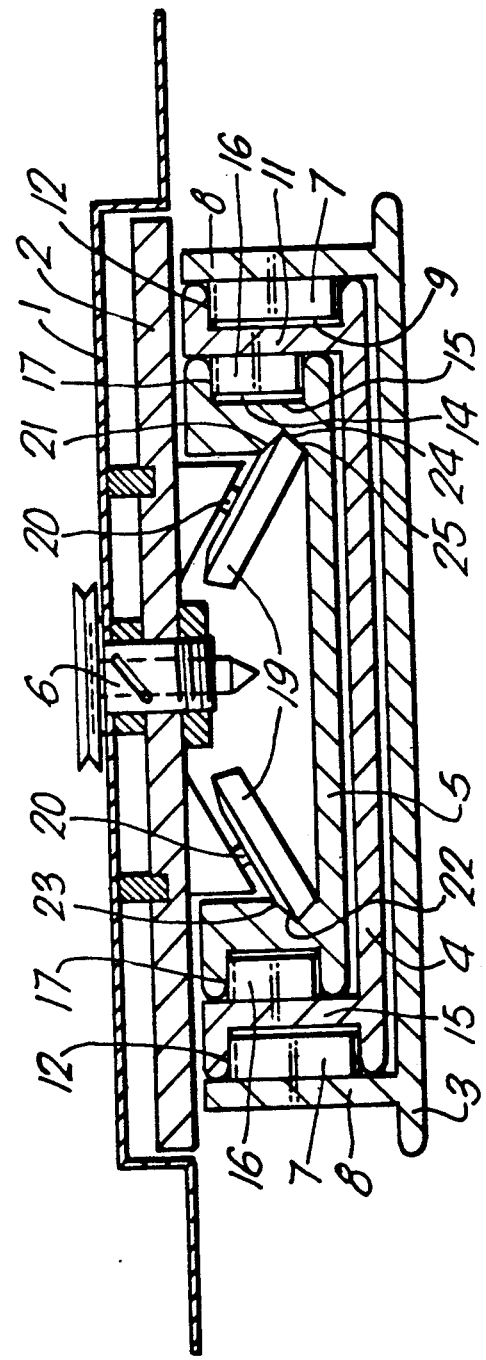
Figure 3:
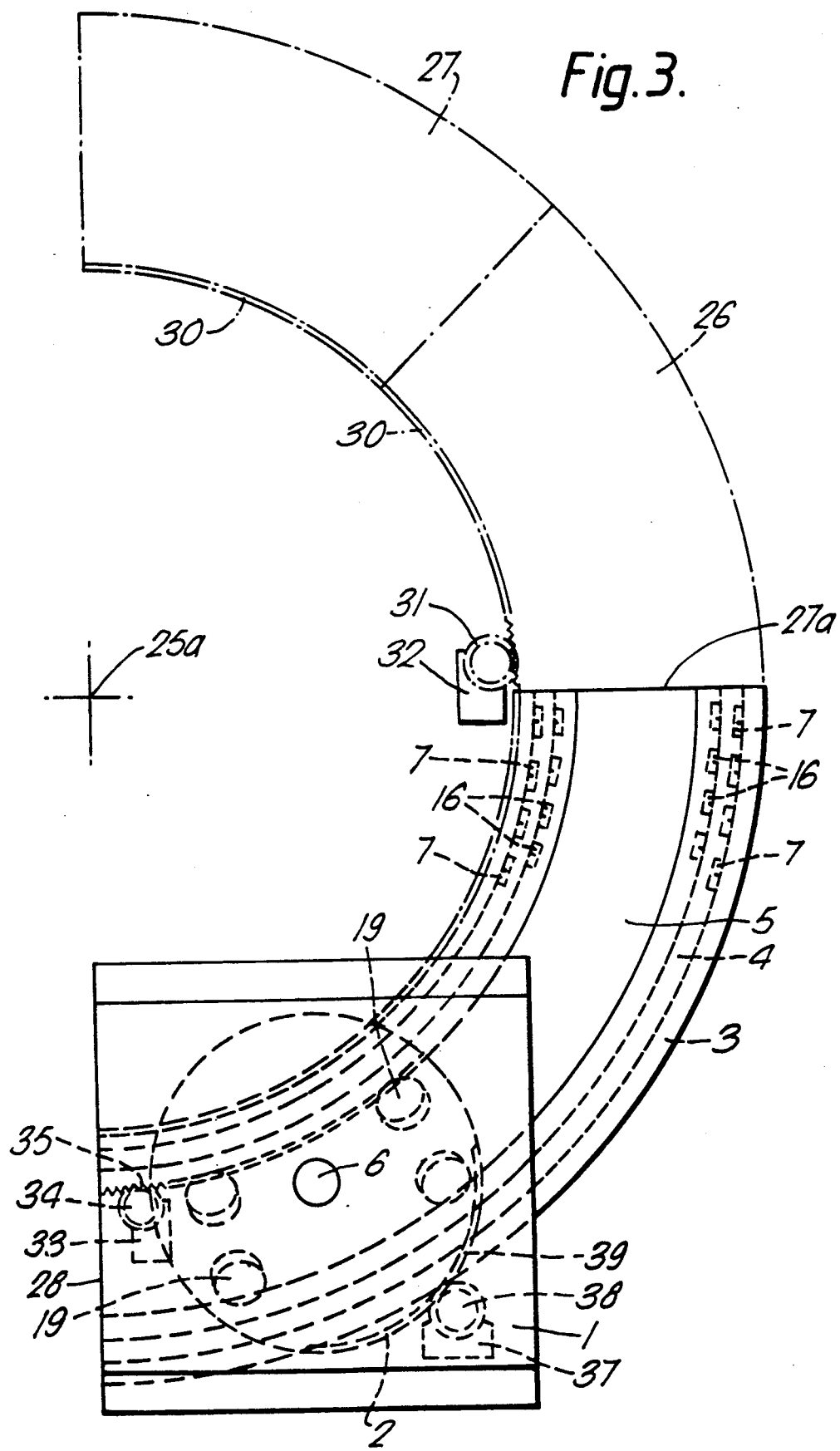

Embodiments of the invention will now be described, by way of example, with reference to the accompanying drawings in which:

FIG. 1 is a diagrammatic plan view of a part of a telescopic assembly for mounting a seat, FIG. 2 is a diagrammatic cross section through the telescopic assembly showing the way in which the sections interlock, FIG. 3 is a diagrammatic plan view, similar to that of FIG. 1, of an alternative arrangement, FIG. 4 is a diagrammatic perspective view of an arrangement for moving a seat, and FIG. 5 is a diagrammatic cross-section through a seat mounting arrangement, illustrating two different forms of interlocking curved sections.

Referring now to FIGS. 1 and 2 of the drawings, there are shown a mounting plate 1 for a seat, a carriage 2 upon which the plate 1 is mounted and an interlocking assembly of curved sections 3, 4 and 5 which telescope together. A pivot arrangement for a seat is indicated generally at 6.

The curved section 3, which is fixed relative to a vehicle, acts as a base for the assembly and is provided with a series of wheels or roller bearings 7 on the inside of its vertical walls 8.

The curved section 4 is so formed that channels 9 are provided on the outside of its vertical walls 11. The wheels or roller bearings 7 run in the respective channels 9 with the upper edges 12 of the channels 9 resting on the wheels or roller bearings 7.

Similarly, the curved section 5 has channels 14 on the outside of its vertical walls 15 and wheels or roller bearings 16 which are on the inside of the respective walls 11 run in the channels 14. The upper edges 17 of the channels 14 rest on the wheels on roller bearings 16.

Depending from the carriage 2, there are four support wheels 19 which are rotatable on shafts 20. The wheels 19 run in respective grooves 21 in the inner surface of the curved section 5. The wheels 19 have tapered upper edges 22 which run on the undercut faces 23 of the respective grooves 21 and tapered sides 24 which run on the other faces 25 of the grooves 19.

The interlocking assembly provided by the engagement of the wheels 19 in the grooves 21, the wheels or roller bearings 16 in the channels 14 and the wheels or roller bearings 7 in the channels 9, prevents the carriage 2 and thus any seat mounted on the carriage 2 from tipping sideways about the assembly of curved sections 3 to 5.

It will be seen from FIG. 1, in particular, that the curved section 4, which carries the section 5 upon which the seat mounting plate 1 and the carriage 2 are mounted, may be extended through an arc of about 30° about the point 25a until the position indicated by the dash-dot lines 26 is reached, the section 4 running over the wheels 7.

The section 5 carrying the plate 1 and the carriage 2 may then be extended from the section 4 through a further 60° of arc until the position indicated by the dash-dot lines 27 is reached.

It is thus possible to convey the plate 1 and the carriage 2 with any seat thereon through some 180° in the fully extended position of the assembly and to telescope the assembly so that in the position in which the sections 3 to 5 are telescoped within one another the whole assembly occupies only 90° of arc about the point 25a.

With the assembly shown in solid lines in FIG. 1, one end 27a of the assembly being towards the side of a vehicle and the other end 28 of the assembly being towards the rear of the vehicle, it is possible for a seat on the plate 1 facing forwards within the vehicle to be moved on the extendable seat arrangement until it reaches a position at the end of the dash-dot lines 27 at which the seat is outside of the vehicle and facing rearwards of the vehicle.

Of course, arrangements may be provided, as indicated at 6, for rotating the seat about the assembly.

There will be described below embodiments in which various powered functions are provided.

Referring now to FIG. 3, in which similar parts are indicated by the same reference numerals as those used with reference to FIG. 1, the sections 3, 4 and 5 overlap and the overall width of each of the sections 4 and 5 is the same. One edge 30 of each of the sections 4 and 5 is toothed for at least a part of its length. The toothed edges 30 are better seen when the sections 4 and 5 are in the extended positions 26 and 27 respectively. The toothed edges 30 cooperate with a gear wheel 31 which is driven by a motor 32. The motor 32 is arranged to rotate the gear wheel 31 in one direction to drive firstly the section 5 into the position 26 and subsequently the section 4 and 5 together so that the extended section 5 moves to the position 27 and the section 4 is moved to the position 26. Of course, it is possible to arrange the positions of the teeth 30 such that first both sections 4 and 5 are first driven to the position 26; section 5 subsequently being driven alone to the position 27. By driving the motor 32 in reverse, or by means of a gear change, it is possible to rotate the gear wheel 31 in the reverse direction and to retract the sections 4 and 5 to their original positions. It will be appreciated that other drive means than the gear wheel 31 and the motor 32 may be used to move the sections 3, 4 and 5. It will also be understood that the teeth 30 could be arranged on the outer curved edges instead of the inner curved edges of the sections 4 and 5.

At 33, there is shown a second electric motor which is mounted on the carriage 2 and which drives a gear wheel 34. The gear wheel 34 is arranged to engage a toothed edge 35 on an inner portion of the section 5 and the motor 33 may be energised to rotate the gear wheel 34 in either direction and thus to move the carriage 2 and the plate 1 in either direction along the length of the curved section 5.

In order to rotate the plate 1 about the carriage 2, a further electric motor 37 is mounted on the plate 1. The motor 37 drives a gear wheel 38. The gear wheel 38 engages a toothed edge 39 on the carriage 2, and by driving the motor 37 it is possible to cause the plate 1 to be rotated about the carriage 2 as the gear wheel 38 engages the toothed edge 39. According to the direction in which the motor 37 is driven the plate 1 may be rotated in either the clockwise or anti-clockwise direction. It will be appreciated that the electric motor drive means are merely illustrative of the drive means that may be used to power the assembly.

Referring now to FIG. 4, there are illustrated ways of powering other functions of a seat arrangement employing the present invention.

The plate 1 on which the seat is carried is formed with inverted troughs 41, 42 and 43. These troughs form the basic supports for the back and sides of a seat, and beneath the plate 1 there is a corresponding base plate 44 which is rotatable with the plate 1 about the carriage 2. The plate 1 is movable vertically relative to the base plate 44. The power to move the plate 1 vertically is provided by a motor, shown diagrammatically at 45, which drives a scissors lift indicated at 46 housed in inverted trough 43 via a drive shaft 47 and gearing 48. A similarly driven scissors arrangement is provided in inverted trough 42. The plate 1 is driven backwards and forwards, as indicated by arrow 50 relative to the base plate 44 by means of a motor 51 which is housed in inverted trough 41 and which drives a lead screw 52 located in brackets 53 and 54 on the plate 1. A block 55, which is fixed to the base plate 44 via a slot in the plate 1, has a threaded hole which runs on the lead screw 52 in order to provide the relative fore and aft movement between the plate 1 and the base plate 44. It will be understood that the arrangements described are diagrammatic and that there are many ways of implementing the movements described. It will be understood, for example, that bearing arrangements are provided between the scissors lifts 46 and the troughs 42 and 43 in order to enable the fore and aft movement 50 to be made smoothly.

Referring to FIG. 5, broken lines 60 indicate the outline of a seat and, as with FIGS. 3 and 4, similar parts are reference with the same numerals as were used in referring to FIGS. 1 and 2. The pivot arrangement 6, which is shown in FIG. 5 also incorporates a pin 61, which may be moved into or out of a hole in the member 5 and thereby lock or release the assembly of the carriage 2 and the seat mounting plate 1 to or from the section 5. In the arrangement of FIG. 5 the pin 61 is operated by an electrically operated solenoid, whereas in the arrangement of FIGS. 1 and 2 the pivot 6 incorporates a mechanically operated pin to lock or release the assembly.

On opposite sides of a centre line 65 shown in FIG. 5, there are illustrated alternative forms of the sections 3, 4 and 5.

At 66, there is shown an assembly of sections 3, 4 and 5 corresponding to that described with reference to FIGS. 1 and 2, in which the upper parts 67, 68 and 69 nest one within the other, while at 71 there is shown an assembly corresponding to that of FIG. 3, in which the upper parts 72, 73 and 74 overlap one another and the drive motor 32 with its gear wheel 31 engaging the toothed edges 30 of the sections 3, 4 and 5 can be seen. It will also be noted that the part 72 has a strengthening member 75 and that the cross sections of the bases of the sections 3, 4 and 5 are, in the assembly 71, dished in order to increase their strength.

It will be appreciated, as has been indicated above, that variations and modifications may be made and that the particular embodiment has been described above my way of example only.

The sections 3, 4 and 5 may, for example, be straight and means may be provided in the vehicle, with such a modification, for the section 3 to be rotated with respect to the vehicle in order to enable a seat to be conveyed in and out of the vehicle.

Other bearings than roller bearings may be used, for example ball races or solid bearings. It is, of course, possible to employ other combinations of extendable section and to employ different lengths of overlap between the sections from those shown. For example, although the curved section 4 which is shown in the arrangement of FIG. 1 extends through an arc of about 30°, and the section 5 extends over 60°, they could each extend over 45°.

The seat which is carried by the telescopically interlocking sections may be of any suitable type, for example it may be a wheel chair, or a normal-looking vehicle seat.

It will also be understood that, although, in the embodiments described, the interlocking section which carries the seat is shown fitted in a dished manner within the other two sections, it would be possible, for example, for the sections 3, 4 and 5 to be inverted, compared to the arrangements shown in FIG. 5, and for the section carrying the seat to be the outer one of the interlocking sections, with a suitable redesigning of the bearing arrangements.

In the powered arrangements of FIGS. 3–5, it is possible to control the sources of power by means of programmed microprocessors and, by incorporating memories in the control arrangements, it is possible to program into the systems an individual's requirements for movement.

It will be understood that the arrangements described provide space saving, compact and sturdy assemblies.

I claim:

1. An extendable seat arrangement for use in moving a seat into and out of a confined space, including a base, a plurality of curved interlocking sections, the curved interlocking sections being designed to telescope with one another and with the base so that they can retract and extend relative to the base, a carriage mounted upon the one of the interlocking sections which is able to extend the furthest from the base, and a mounting plate for a seat, the mounting plate for a seat being pivotally attached to the carriage for rotation relative thereto.

2. An extendable seat arrangement as claimed in claim 1 including support means depending from the carriage to engage the said one of the interlocking sections, the support means enabling the carriage to travel along the said one of the interlocking sections.

3. An extendable seat arrangement as claimed in claim 2 including bearing means arranged between the curved interlocking sections.

4. An extendable seat arrangement as claimed in claim 3 in which the bearing means provides the means to interlock the sections together and includes a wall along the side of one of the curved interlocking sections, a channel in the outer face of the wall, the wheels or bearings on a wall of another of the curved interlocking sections cooperating with the channel in the wall of the one section.

5. An extendable seat arrangement as claimed in claim 2 including motor driven means for moving the curved interlocking sections between the positions in which they are extended and retracted relative to the base.

6. An extendable seat arrangement as claimed in claim 5 including motor driven means for rotating the seat mounting plate relative to the carriage.

7. An extendable seat arrangement as claimed in claim 5 including means to provide relative movement both fore and aft and vertically between a base plate for a seat and the seat mounting plate.

* * * * *